March 3, 1959  E. G. BROWN  2,876,384
AUTOMOBILE LIGHT CONTROL SYSTEM
Filed May 26, 1958  2 Sheets-Sheet 1

INVENTOR.
EARL G. BROWN
BY M. Ralph Shaffer
HIS ATTORNEY

March 3, 1959  E. G. BROWN  2,876,384
AUTOMOBILE LIGHT CONTROL SYSTEM
Filed May 26, 1958  2 Sheets-Sheet 2

INVENTOR.
EARL G. BROWN
BY M. Ralph Shaffer
HIS ATTORNEY

United States Patent Office 2,876,384
Patented Mar. 3, 1959

2,876,384
AUTOMOBILE LIGHT CONTROL SYSTEM
Earl G. Brown, Salt Lake City, Utah
Application May 26, 1958, Serial No. 737,743
2 Claims. (Cl. 315—81)

The present invention, while described in terms of headlight control of automobiles, will be understood to apply with equal force to the control of rear or back-up lights thereof, and also to existing systems in general.

This invention relates to control systems for controlling automatically the orientation of automobile headlights in accordance with the instantaneous direction of automobile travel, and more particularly to a new and improved automobile headlight control system which depends in the main upon electrical instead of mechanical linkage, is highly insensitive to variation in battery supply voltage, has an excellent response time and is of unusually long life.

In the past there have been devised many types of orientationally adjustable headlight constructions, and controlling devices therefor, for achieving selective and continuous orientation of automobile headlights in accordance with the instantaneous direction of travel of automobile. The purpose for such an automatic system is to enable the driver to see clearly in the direction in which he is turning the vehicle.

Prior systems appear to have certain disadvantages. Those systems which depend primarily upon mechanical linkages to couple the steering column and its instantaneous rotational orientation to the headlights are very complicated from a mechanical point of view, requiring as they do extensive gearing and numerous mechanical parts. See in this regard the Kocian and Hoag constructions, United States Patents Nos. 2,707,748 and 1,948,264, respectively.

Early devices in this field have also approached the problem from a semielectrical point of view, using solenoids which are either wholly actuated or dormant (see the Snowden device in United States Patent No. 1,248,191), or which are subjected to varying current loads in accordance with the automatic shorting-out of appropriate segments of associated resistors (see the Bailey apparatus in United States Patent No. 1,547,490). The latter types of devices appear to be somewhat unsatisfactory in that D. C. solenoids are susceptible in characteristic of operation to fluctuations in the battery supply voltage; also, and more important, the shorting-out of resistor lengths by movable taps subjects the control system to severe wear, arcing and short life.

Accordingly, a general object of the present invention is to provide a new and improved automobile headlight control system.

A further object of the present invention is to provide new and improved automobile headlight control system which avoids extensive mechanical linkages, and in lieu thereof employs a minimum of electrical components of a type which lend the system a high degree of accuracy and unusually long life.

According to the present invention a selsyn system is employed to link the steering column of the automobile with its headlights each of the latter being rotationally displaceable about a respective vertical axis. At least two selsyn motors, i. e. a generator selsyn and a motor selsyn will be required in the system; however, where it is desirable to drive each of the two headlights by a separate motor selsyn, then a total of three selsyn motors will be required. The rotor shaft of the generator selsyn is appropriately geared down with the steering column. The stator windings on the generator and motor selsyn are directly coupled together in the usual manner. Where a single motor selsyn is employed, the rotor shaft thereof is mechanically coupled to the headlights which are appropriately ganged together. If two motor selsyns are employed, then each rotor of the respective motor selsyns is coupled to its associated headlight. Accordingly, when the steering column is rotationally displaced, the rotor winding of the generator selsyn will be displaced respective to the stator windings thereof, thus effectuating an induced voltage of a certain character in the stator winding of the generator selsyn which is transmitted to the stator winding of the motor selsyn or selsyns, thereby causing a reaction of the energized rotor winding of the motor selsyn with respect thereto so as to produce through its shaft and through appropriate gearing the appropriate rotational displacement of the automobile headlights.

The system is powered by either a vibrator, for selsyns having somewhat reduced current ratings, or by a converter, where the selsyns require high currents for operation. The vibrator or converter may be run off the automobile battery system. A single-pole single-throw switch is inserted between the battery system and the parallel connected selsyn system and headlight lamp circuit for selectively actuating the two simultaneously. Thus, during the daylight hours neither the headlights nor the selsyns need be operative.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
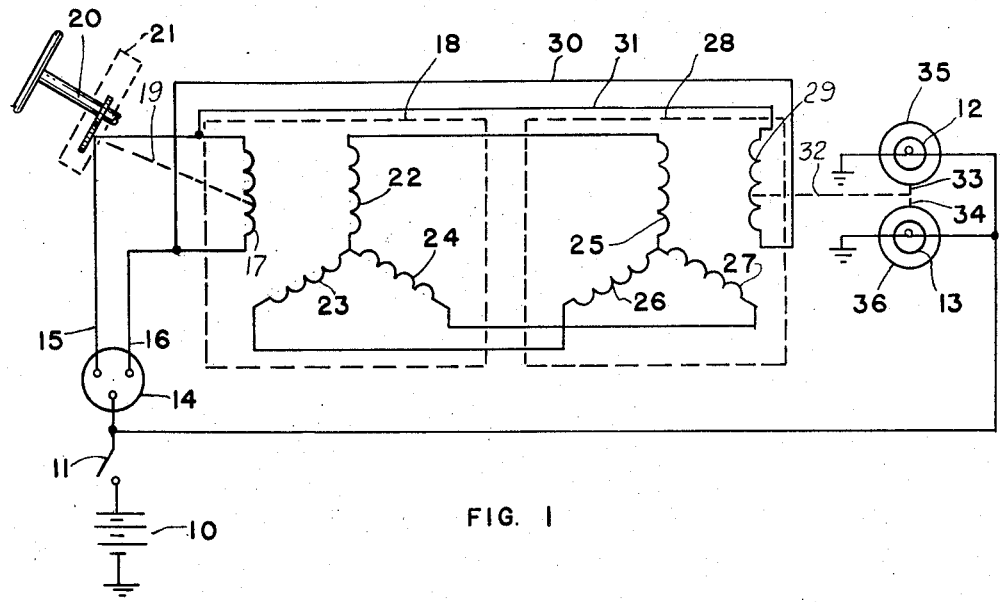
Figure 1 is a schematic diagram of an automatic headlight control system according to the present invention.

In Figure 1 battery 10 is grounded at its negative terminal and is coupled through on-off switch 11 and through the parallel connected headlight lamps 12 and 13 to ground. On-off switch 11 is also coupled to a "converter" (vibrator or converter) 14 the output terminals 15 and 16 of which are coupled across rotor winding 17 of generator selsyn 18. Rotor winding 17 is mechanically coupled through its shaft 19 to steering column 20 via gearing 21. The stator windings 22, 23 and 24 of generator selsyn 18 are respectively coupled to stator windings 25, 26 and 27 of motor selsyn 28 in a conventional manner as shown. Rotor winding 29 of motor selsyn 28 is coupled across rotor winding 17 of generator selsyn 18 by leads 30 and 31 as indicated. Rotor winding 29 is mechanically coupled (indicated by dotted lines 32, 33 and 34) to the headlights 35 and 36 housing the lamps 12 and 13, respectively.

Figure 2:
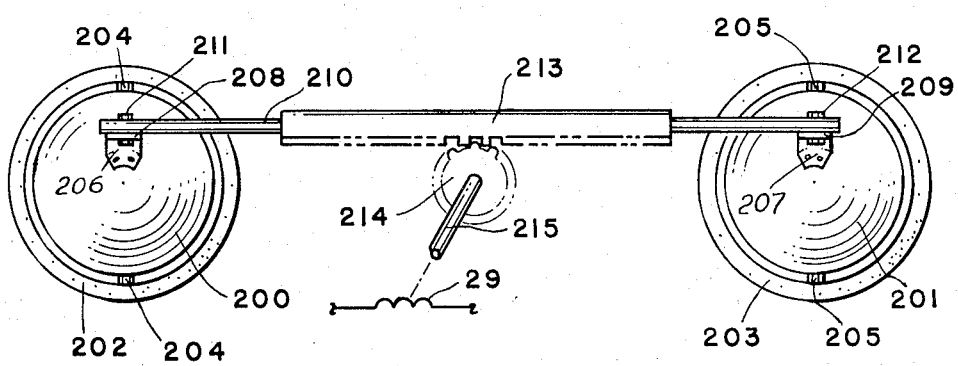
Figure 2 is a forward elevational view looking toward the rear of the automobile headlights and a representative simple coupling means associated therewith.

Typical mechanical coupling leading from the rotor shaft of the motor selsyn to the headlights, as illustrated by dotted lines 32, 33 and 34 in Figure 1, is shown in Figure 2. In Figure 2 each of the headlights 200 and 201 is mounted within the respective headlight holder 202 and 203 by means of a pair of vertically disposed pivot pins 204 and 205, respectively. Brackets 206 and 207 are riveted to the outer housings of the headlights 200 and 201 and are provided with upper flanges 208 and 209 having respective apertures (not shown). Shaft 210 is provided with apertures at opposite ends thereof and is mounted to the brackets 206 and 207 by means of pivot pins 211 and 212, respectively passing through the corresponding apertures. Thus, shaft or rod 210 is a means by which the two rotationally displaceable headlights are ganged together.

Mounted upon shaft 210 is a rack 213 which couples with pinion 214, the latter being mounted to the rotor shaft associated with rotor 29 of motor selsyn 28 in Figure 1.

Preferably, either the rack 213 or the pinion 214 should have a reasonably wide girth so that the slight forward advances of shaft 210 as the headlights are rotated from side to side will not disturb system operation.

It will be observed that when the stator windings 25, 26 and 27 of motor selsyn 28 experiences an induced voltage of a certain character, the associated rotor shaft 215 in Figure 2 will rotate so as to cause an advancement of rack 213 toward either the right or toward the left, depending upon the character of the induced voltage. This horizontal translation of rack 213 produced a corresponding rotational displacement of the headlights 200 and 201 about the axes of pivot pins 204 and 205.

Figure 3:
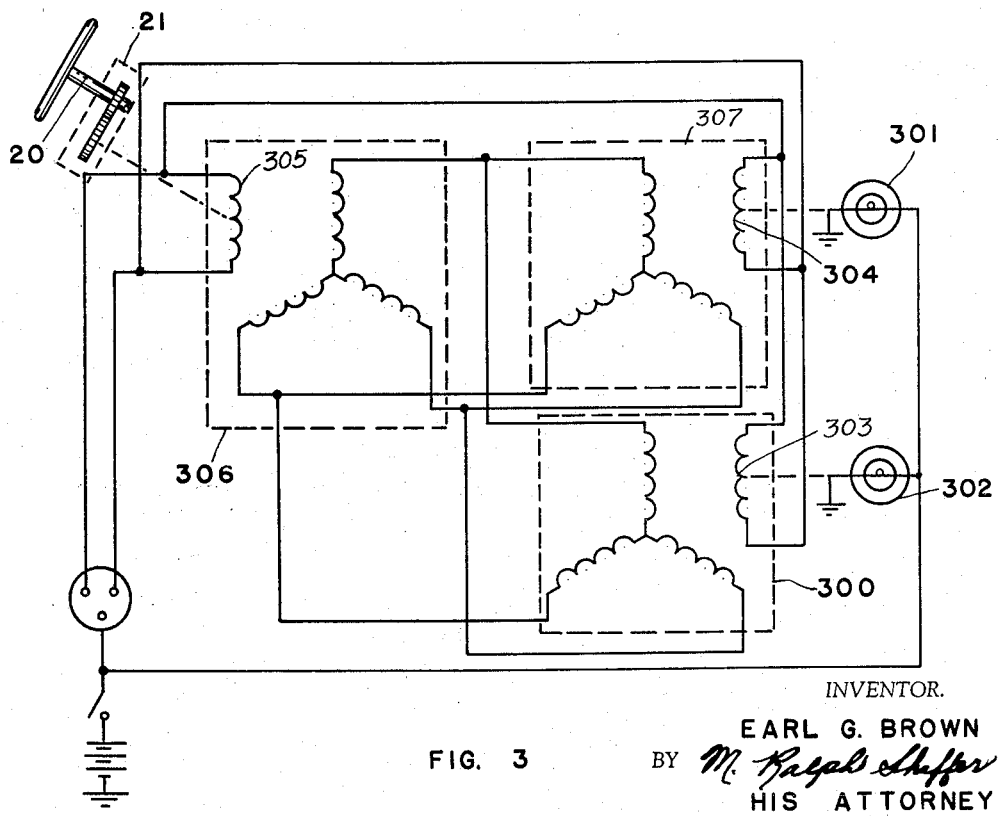
Figure 3 is an alternate embodiment of the present invention wherein a pair of motor selsyns are employed to drive the automobile headlights.

The embodiment of Figure 3 is substantially similar to that of Figure 1, with the exception that a new motor selsyn 300 is added so that the headlights 301 and 302 may be separately driven. The stator windings of motor selsyn 300 are parallel coupled in conventional manner to the stator leads of the other two selsyns. The rotor windings 303 and 304 are coupled in parallel to the rotor winding 305 of the generator selsyn 306.

Figure 4:
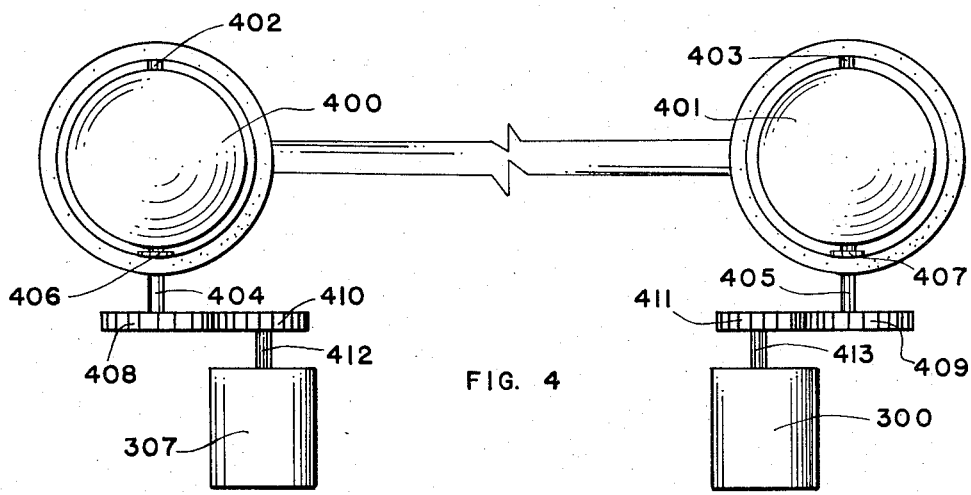
Figure 4 is a forward elevation looking toward the rear portions of the automobile headlights, showing with particularity the means of coupling the motor selsyns with their respective headlights.

Figure 4 illustrates that the headlights 400 and 401 are fixedly disposed by means of pivot pins 402 and 403 and shaft mounts 404 and 405. Retainers 406 and 407 are keyed into the shaft mounts 404 and 405 so as to retain its same respective dispositions. Affixed to shaft mounts 404 and 405 are gears 408 and 409, respectively. Each of these gears is respectively coupled to gears 410 and 411, these latter being mounted upon rotor shafts 412 and 413 of the two motor selsyns 300 and 307 shown in Figure 3. Accordingly, when the motor selsyns are energized so as to produce a rotation in the rotor shafts thereof, the gears 408 and 410 and 409 and 411, respectively, produce the rotational displacement of the respective headlights 400 and 401.

In the second embodiment of the present invention, as illustrated in Figures 3 and 4, the necessity of a cross arm or shaft intercoupling the two headlights is avoided, thus causing no difficulty in the forward body design of certain types of cars.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An automobile, automatically controlled headlight system including, in combination: steering column means provided with a steering wheel for directing the travel of said automobile; generator and motor selsyns each having a rotor shaft and rotor and stator windings, said generator and motor selsyns being coupled together electrically in the usual manner, i. e. rotor winding across rotor winding and respective stator windings across respective stator windings; gear means intercoupling said steering column with said rotor shaft of said generator selsyn; a pair of headlights each rotationally displaceable about a respective vertical axis; mechanical power transfer means coupled between said rotor shaft of said motor selsyn and said headlights and responsive to the rotational displacement of said motor selsyn rotor shaft for rotationally displacing said headlights in tandem in accordance with the instantaneous rotational disposition of said steering wheel; a storage battery for supplying direct current electrical energy for said automobile; and converter means coupled to said battery and resonsive to the electrical energy thereof for supplying alternating current power to said stator windings of said motor and generator selsyns; means so connecting said converter to said selsyn stator windings; and a headlight filament circuit coupled to said battery.

2. Apparatus according to claim 1 in which said connecting means comprises a switch, said headlight filament circuit shunting the battery and switch combination.

References Cited in the file of this patent

UNITED STATES PATENTS

| | | |
|---|---|---|
| 859,403 | Miesse | July 9, 1907 |
| 1,068,111 | Crain | July 22, 1913 |
| 1,123,067 | Barkhausen | Dec. 29, 1914 |
| 1,209,155 | Heard | Dec. 19, 1916 |
| 1,539,187 | Hewlett et al. | May 26, 1925 |
| 1,547,490 | Bailey | July 28, 1925 |
| 2,707,748 | Kocian | May 3, 1955 |